US010831418B1

(12) United States Patent
Morales

(10) Patent No.: US 10,831,418 B1
(45) Date of Patent: Nov. 10, 2020

(54) PRINT DENSITY CONTROL VIA PAGE DESCRIPTION LANGUAGE CONSTRUCTS

(71) Applicant: KYOCERA Document Solutions, Inc., Osaka (JP)

(72) Inventor: Javier A. Morales, Rochester, NY (US)

(73) Assignee: KYOCERA Document Solutions, Inc., Osaka (JP)

( * ) Notice: Subject to any disclaimer, the term of this patent is extended or adjusted under 35 U.S.C. 154(b) by 0 days.

(21) Appl. No.: 16/510,383

(22) Filed: Jul. 12, 2019

(51) Int. Cl.
*G06F 3/12* (2006.01)
*G06K 9/00* (2006.01)
*G06K 9/62* (2006.01)

(52) U.S. Cl.
CPC .......... *G06F 3/1208* (2013.01); *G06F 3/1254* (2013.01); *G06K 9/00456* (2013.01); *G06K 9/6256* (2013.01); *G06F 3/1298* (2013.01); *G06K 2209/27* (2013.01)

(58) Field of Classification Search
CPC .... G06F 3/1208; G06F 3/1254; G06F 3/1298; G06K 2209/27; G06K 9/00456; G06K 9/6256
USPC ....................................................... 358/1.15
See application file for complete search history.

(56) References Cited

U.S. PATENT DOCUMENTS

| 7,021,734 | B2 | 4/2006 | Lee | |
|---|---|---|---|---|
| 7,384,112 | B2 | 6/2008 | Hasegawa | |
| 7,618,108 | B2 | 11/2009 | Ito | |
| 8,373,895 | B2 * | 2/2013 | Fan | H04N 1/32203 358/1.15 |
| 9,135,534 | B2 | 9/2015 | Takamoto | |
| 2004/0252344 | A1 * | 12/2004 | Foster | G06K 15/128 358/2.1 |
| 2006/0192984 | A1 * | 8/2006 | Barry | G06F 3/1208 358/1.9 |
| 2008/0144076 | A1 * | 6/2008 | Boliek | H04N 1/00204 358/1.15 |
| 2008/0235276 | A1 * | 9/2008 | Erol | G10L 13/00 |

(Continued)

OTHER PUBLICATIONS

Riso Corp, *ComColor FW5230 User Manual*, Jun. 2016.
Jason Lisi, *Using PDF to associate processing steps and content data*, May 26, 2016.

*Primary Examiner* — Allen H Nguyen
(74) *Attorney, Agent, or Firm* — Rowan TELS LLC

(57) ABSTRACT

A system and method for controlling the rendering of objects in a printed document through a raster image processor include operating a document parser to extract document separation identifiers from a document. The method then operates an associator to label at least one document separation identifier associated with full density document objects and the at least one document separation identifier associated with less than full density document objects in the document. The method then communicates the labeled document separation identifiers to a document rendering engine. The method then operates the document rendering engine to generate rendering instructions through operation of a constructor configured by the labeled document separation identifiers. The method then operates a printer configured by the rendering instructions to generate at least one printed document including full density printed objects and less than full density printed objects.

18 Claims, 14 Drawing Sheets

(56) References Cited

U.S. PATENT DOCUMENTS

2011/0078191 A1\* 3/2011 Ragnet ............... G06K 9/00879
 707/780
2018/0015750 A1\* 1/2018 Ito ............................ H04N 1/38
2018/0373472 A1\* 12/2018 Itoh ....................... G06F 3/1254

\* cited by examiner

PRINT DENSITY CONTROL VIA PAGE DESCRIPTION LANGUAGE CONSTRUCTS

BACKGROUND

Inkjet printers have multiple print modes that represent different choices in terms of image quality, ink usage and printing speed tradeoffs. Higher image quality levels on inkjet printers may result in slower print speeds and higher ink use. Conversely, lower ink usage and higher print speeds may correlate with lower image quality. In general, the speed is related to image resolution (lower resolution enabling higher print speeds), whereas the ink use is related to image quality (less saturated appearance enabling lower ink usage). Print shops may understand this tradeoff and use it to determine the optimal settings for producing specific jobs.

However, these tradeoffs can be problematic. Print modes that use less ink may produce less saturated colors, which may diminish the contrast between, for example, barcodes and a substrate. This may be especially problematic if printing on cheaper, lower albedo papers. Low contrast printing of the barcodes, which are used for finishing device control, end to end job tracking, postal tracking and other uses, may result in them not being readable.

Existing solutions to the barcode printing problem define rectangles that always print at the highest quality level. However, the solution is problematic because the barcode areas are at fixed coordinates and pages in the document. As such, multiple barcode area templates must be created for different jobs. In addition, these templates require that imposition and press sheet size do not change. Thus, a solution is needed that is flexible in terms of scaling to a large number of jobs or to large variable data documents.

BRIEF SUMMARY

A method for controlling the rendering of objects in a printed document through a raster image processor may involve operating a document parser to extract document separation identifiers from a document. The method may then operate an associator to label at least one document separation identifier associated with full density document objects and the at least one document separation identifier associated with less than full density document objects in the document. Labeling a document separation identifier may include identifying them by using rendering associations in an association table for labeling the document separation identifiers. The method may then communicate the labeled document separation identifiers to a document rendering engine. The method may then operate the document rendering engine to generate rendering instructions through operation of a constructor configured by the labeled document separation identifiers. The method may then operate a printer configured by the rendering instructions to generate at least one printed document comprising full density printed objects and less than full density printed objects.

In some configurations, the method may display the labeled document separation identifiers through an output configurator in a user interface. The method may then operate the output configurator to receive a selection control for the at least one document separation identifier displayed in the output configurator. The selection control may identify at least one document object associated with a document separation identifier as a full density object or a less than full density object. The output configuration may then be operated to communicate the selection control for the at least one document separation identifier as a rendering control to the document rendering engine. The document rendering engine may then be operated to generate display instructions through operation of a document simulator configured by the rendering control. The document rendering engine may then display a document preview comprising visible document objects through a document viewer in the user interface as configured by the display instructions.

A system for controlling the rendering of objects in a printed document through a raster image processor may include document parser, an associator, a document rendering engine, and a printer. The document parser may be configured to extract document separation identifiers from a document. Document parsers are known in the art and techniques for parsing documents are well-known and will not be elaborated upon herein. The associator may be configured to label at least one document separation identifier associated with full density document objects and the at least one document separation identifier associated with less than full density document objects in the document. The document rendering engine may be configured to receive labeled document separation identifiers. The document rendering engine may also generate rendering instructions through operation of a constructor configured by the labeled document separation identifiers. The printer may be configured by the rendering instructions to generate at least one printed document comprising full density printed objects and less than full density printed objects.

In some configurations, the system for controlling the rendering of objects in a printed document through a raster image processor may include a user interface comprising an output configurator and a document viewer. The output configurator may be configured to display the labeled document separation identifiers. The output configurator may also be configured to receive a selection control for the at least one document separation identifier displayed in the output configurator, wherein the selection control identifies at least one document object associated with a document separation identifier as a full density object or a less than full density object. The output configurator may be configured to communicate the selection control for the at least one document separation identifier as a rendering control to the document rendering engine.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
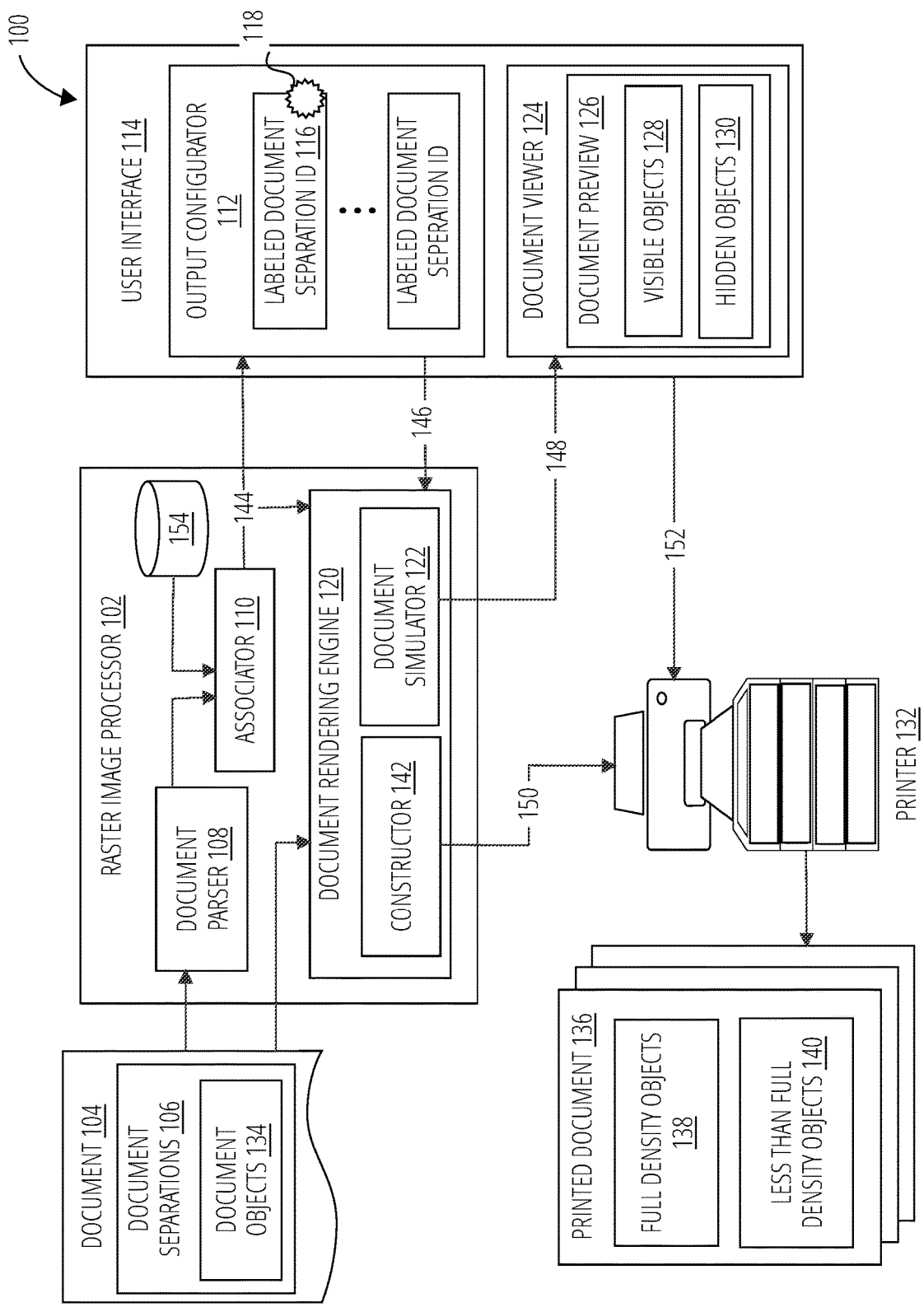
FIG. 1 illustrates a system 100 in accordance with one embodiment.

"Associator" refers to logic to generate a tuple in a database or data structure in memory.

"Backpropagation" refers to an algorithm used in artificial neural networks to calculate a gradient that is needed in the calculation of the weights to be used in the network. It is commonly used to train deep neural networks, a term referring to neural networks with more than one hidden layer. For backpropagation, the loss function calculates the difference between the network output and its expected output, after a case propagates through the network.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Configurator" refers to a user interface that guides a user through a configuration or selection process. As an example, the output configurator displays document separation identifiers grouped in different tabs that may be selected to alter the appearance of a printed document.

"Constructor" refers to a subroutine used to assemble rendering instructions that are communicated to a printer for generating a printed document.

"Document parser" refers to Logic to scan a document and identify subparts of the document.

"Document separation identifier" refers to Values to determine the appearance of objects when printed. Examples of document separation identifiers include spot colors, XMP metadata, PDF layers, VT metadata, and PDF bookmarks.

"Firmware" refers to Software logic embodied as processor-executable instructions stored in read-only memories or media.

"Full density" refers to a resolution density level of content to be printed that has not had the resolution density or resolution reduced (e.g., to save ink usage).

"Full density document objects" refers to portions of a document that are printed at full density.

"Hardware" refers to Logic embodied as analog or digital circuitry.

"Hyperbolic tangent function" refers to a function of the form tan h(x)=sin h(x)/cos h(x). The tan h function is a popular activation function in artificial neural networks. Like the sigmoid, the tan h function is also sigmoidal ("s"-shaped), but instead outputs values that range (−1, 1). Thus strongly negative inputs to the tan h will map to negative outputs. Additionally, only zero-valued inputs are mapped to near-zero outputs. These properties make the network less likely to get "stuck" during training.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Loss function" refers to also referred to as the cost function or error function (not to be confused with the Gauss error function), is a function that maps values of one or more variables onto a real number intuitively representing some "cost" associated with those values.

"Metadata" refers to data about data. Metadata may provide additional information about a certain file such as the author, creation data and the application used to create the file.

"Metadata flagged content objects" refers to objects in documents related to content that have been flagged in metadata, such as PDF or VT metadata identifying tables or spreadsheets.

"Metadata flagged image objects" refers to objects in documents related to images that have been flagged in metadata, such as XMP metadata corresponding to an image file such as a JPEG.

"PDF/VT metadata" refers to an international standard that defines the use of PDF as an exchange format optimized for variable and transactional printing.

"ReLU" refers to a rectifier function, an activation function defined as the positive part of ints input. It is also known as a ramp function and is analogous to half-wave rectification in electrical signal theory. ReLu is a popular activation function in deep neural networks.

"Rendering engine" refers to Software that converts the graphics commands from a printing application into a data format that a printer uses to render the image on a page.

"RIP" refers to Raster image processor or raster image processing. A RIP system converts Page Description Language (PDL) data, such as Portable Document Format (PDF) developed by Adobe Systems Inc., or XPS developed by Microsoft Corporation, into pixel data that can be used as input to a digital printer.

"Sigmoid function" refers to a function of the form $f(x)=1/(\exp(-x))$. The signmoid function is used as an activation function in artificial neural networks. It has the property of mapping a wide range of input values to the range 0-1, or sometimes −1 to 1.

"Softmax function" refers to a function of the form $f(x_i)=\exp(x_i)/\text{sum}(\exp(x))$ where the sum is taken over a set of x. Softmax is used at different layers (often at the output layer) of artificial neural networks to predict classifications for inputs to those layers. The softmax function calculates the probabilities distribution of the event xi over 'n' different events. In general sense, this function calculates the probabilities of each target class over all possible target classes. The calculated probabilities are helpful for predicting that the target class is represented in the inputs. The main advantage of using Softmax is the output probabilities range. The range will 0 to 1, and the sum of all the probabilities will be equal to one. If the softmax function used for multi-classification model it returns the probabilities of each class and the target class will have the high probability. The formula computes the exponential (e-power) of the given input value and the sum of exponential values of all the values in the inputs. Then the ratio of the exponential of the input value and the sum of exponential values is the output of the softmax function.

"Software" refers to Logic implemented as processor-executable instructions in a machine memory (e.g. read/write volatile or nonvolatile memory or media).

"Spot color" refers to a method of specifying and printing colors in which each color is printed with its own ink. By contrast, process color printing uses four inks (cyan, magenta, yellow, and black) to produce all other colors.

"Visible document objects" refers to Document objects associated with document separation identifiers that can be seen in a printed document.

A method for controlling the rendering of objects in a printed document through a raster image processor leverages document separation identifiers, such as spot colors, to define content within a document that should print at the highest density level.

When designing documents, a user may use a spot color with a specific name or with a specific text string in the name to identify content that should print at full density. The name may be anything as long as the raster image processor understands the meaning of the name.

Spot color processing is a function of many raster image processors. In the present disclosure, however, the raster image processor may look for a specific string in the spot color name. Any object that uses the particular spot color name (in whole or in part) may be rendered as full density. The user may perform raster image processing on a job at a lower resolution density and resolution in order to enable faster, cheaper printing while retaining full density content.

In some configurations, the rendering of different densities may depend on how the raster image processor implements the different image quality levels. For example, the raster image processor may render the document using nominal CMYK values and then apply an abstract profile or a transfer curve to the output in order to reduce ink use. In this case, the system would generate two output files from the raster image processor—one with full density content and one with everything else. The abstract profile or the transfer curve is then applied to the normal output file to reduce ink usage. The full density content and the normal content are then merged before the image content is sent to the printer.

Alternatively, the system may apply different color transformations to the full density and normal content as part of the nominal color transformation in which case a single output file is generated.

The system and method for controlling the rendering of objects in the raster image processor may differentiate objects that should be printed at full density vs objects that can be printed using less toner or ink. The rendering may be done through software and may be agnostic to the printing technology utilized such that the method may be implemented with electrophotography, inkjet, or conventional printing.

In some configurations, the values used to determine the appearance of the objects that use the spot color may come from at least one of alternate color space values and spot color libraries.

The alternate color space values are part of standard spot color definitions for a spot color that differs between the different color spaces such as RGB and CMYK color space models.

The spot color libraries are collections of named spot colors. If the string used to identify full density content is part of a spot color family name, then the rest of the name may contain the usual spot color names (e.g., Pantone 395 would print using the overall density whereas pantone 395 FD would print at full density). The system would use standard color libraries (e.g., Pantone, HKS, TOYO, etc.) to determine the appearance of the full density objects.

This system and method may also be extended to support multiple density levels via different spot colors. Alternatively, the system and method may be implemented to simply print all spot colors at full density. In this configuration, the appearance of spot color libraries may be kept consistent while printing the rest of the document.

The system may also support alternate mechanisms for differentiating full density content from other content. In some configurations, the system and method may identify full density (or different density levels) using PDF layers (aka Optional Content Groups) with specific names. The density of individual objects on the page may be controlled in this manner.

In some configurations, the system and method may use XMP metadata to flag images that should print at full density.

In some configurations, the system and method may tag objects using PDF/VT metadata so that, for example, the content part of a bill is printed at full density but the legal disclaimers are printed at lower density.

In some configurations, the system and method may utilize PDF bookmarks to control the density of individual pages in the document.

Any or all of the above mechanisms may be combined to allow granular control over the density used for printing specific content in the document.

In some configurations, the system and method may include a machine learning system. The machine learning system may be configured to identify new document separations for the document parser. The machine learning system may also be configured to modify rendering associations in the association table for labeling the document separation identifiers.

In some configurations, the machine learning system may use document separation identifiers as training input. This may allow the machine learning system to learn which types of objects are printed at full density and identify full density objects in documents that do not have separation identifiers.

The system and method may support multiple levels of image quality. The system and method may be configured to, for example, define several gray component replacement (GCR) options and map those to metadata values—whether spot colors, PDF layers, image metadata, or PDF/VT metadata.

Alternatively, the system and method may be configured to a print credit card statement with different densities for the content throughout the entire document. The system and method may be configured to identify and print a corporate logo and barcode at the highest density. Promotional messages may be configured to print at a higher quality, but lower than the quality of the logo. The statement content may print at low quality. The legal disclaimer may be configured to print at an almost draft level of image quality. By printing credit card statements in the aforementioned manner, the system and method would maximize ink savings, while ensuring that the amount of ink applied to an object was based on the value of the appearance of said object.

The system and method allow for the tagging of specific objects in the PDFs for full density printing. By tagging these objects, print shops may be able to reduce the amount ink usage while ensuring the readability of specific content across different pages and documents.

By utilizing spot colors for identifying content, the system and method may be able to tag any document objects as full density objects based on the spot color utilized regardless of how the document was created. This may allow the system and method to find the objects regardless of their location in the document without the need to define "area templates" that must be managed separately and must also be mapped to jobs manually. The system and method may also allow the user to change the location of objects (by changing the content, changing imposition or printing on a different device) without worrying about breaking the full density printing.

In some configurations, the system and method may improve the printing of PDF files by automatically allowing certain content to be printed at full density. For example, text objects such as page numbers (e.g., Page # of #, etc.), blank page notices, optical marks, stamps, and watermarks may be inserted into the PDF document and printed at full density, or less than full density, without significant modification to the printing instructions. Barcodes such as numbering codes (e.g., Code # of #, etc., IntelligentMail (IMB) codes, DataMatrix(ECC200) codes, PDF417 codes, and QRCode (ECC200) may be inserted in the PDF and printed at full density without significant modification to the printing instructions. Images such as logos, backgrounds, and watermarks, may be added to the PDF and printed at full density or less than full density without significant modification to the printing instructions.

FIG. 1 illustrates a system 100 for controlling the rendering of objects in a printed document through a raster image processor. The system 100 comprises a raster image processor 102, a user interface 114, and a printer 132. The raster image processor 102 comprises a document parser 108, an associator 110 with an association table 154, and a document rendering engine 120 comprising a constructor 142 and a document simulator 122. The user interface 114 comprises an output configurator 112 and a document viewer 124.

The raster image processor 102 receives a document 104 comprising document separations 106 corresponding to document objects 134. The document 104 is parsed by the document parser 108 extracting the document separations 106 as document separation identifiers. The document parser 108 communicates the document separation identifiers to the associator 110 which identifies and labels the document separation identifiers as being associated with printing at full density or less than full density. The labeled document separation identifiers 144 are then communicated to the document rendering engine 120. The document rendering engine 120 operates a constructor 142 to assemble rendering instructions 150 that are communicated to a printer 132 for generating a printed document 136. Based on the labels, document objects associated with document separation identifiers associated with full density printing would be full density printed objects 138 in the printed document 136, while document separation identifiers associated with less than full density printing would be less than full density printed objects 140 in the printed document 136.

In some configurations, the associator 110 communicates the labeled document separation identifiers 144 to the output configurator 112 in the user interface 114. The output configurator 112 displays the labeled document separation identifiers 144 and their association with full density printing and less than full density printing. In some instances, a user may enter a selection control 118 for a labeled document separation identifiers 116 shown in the output configurator 112. The selection control 118 may identify a different printing density for the document objects associated with the labeled document separation identifiers 116. The output configurator 112 communicates the selection control 118 for the labeled document separation identifiers 116 as a rendering control 146 that is communicated to the document rendering engine 120.

In some configurations, the document rendering engine 120 may utilize a document simulator 122 to generate a simulated view (document preview 126) of the document 104 in a document viewer 124 representing the changes to the print density or visibility of the labeled document separation identifiers 116 by the selection control 118. The document simulator 122 may be configured by the rendering control 146 to generate display instructions 148. The display instructions 148 may include a modified view of the document 104 as a document preview 126 where the visible document objects 128 are document objects associated with document separation identifiers that have not been modified by the selection control 118. In one example, the document objects that have been modified by the selection control 118 may be hidden document objects 130 if the selection control 118 identifies that the associated object is not to be printed at full density. The user interface 114 may also communicate a print control 152 to the printer 132 notifying the printer 132 to begin printing once changes in the output configurator 112 have been finalized.

Figure 9:
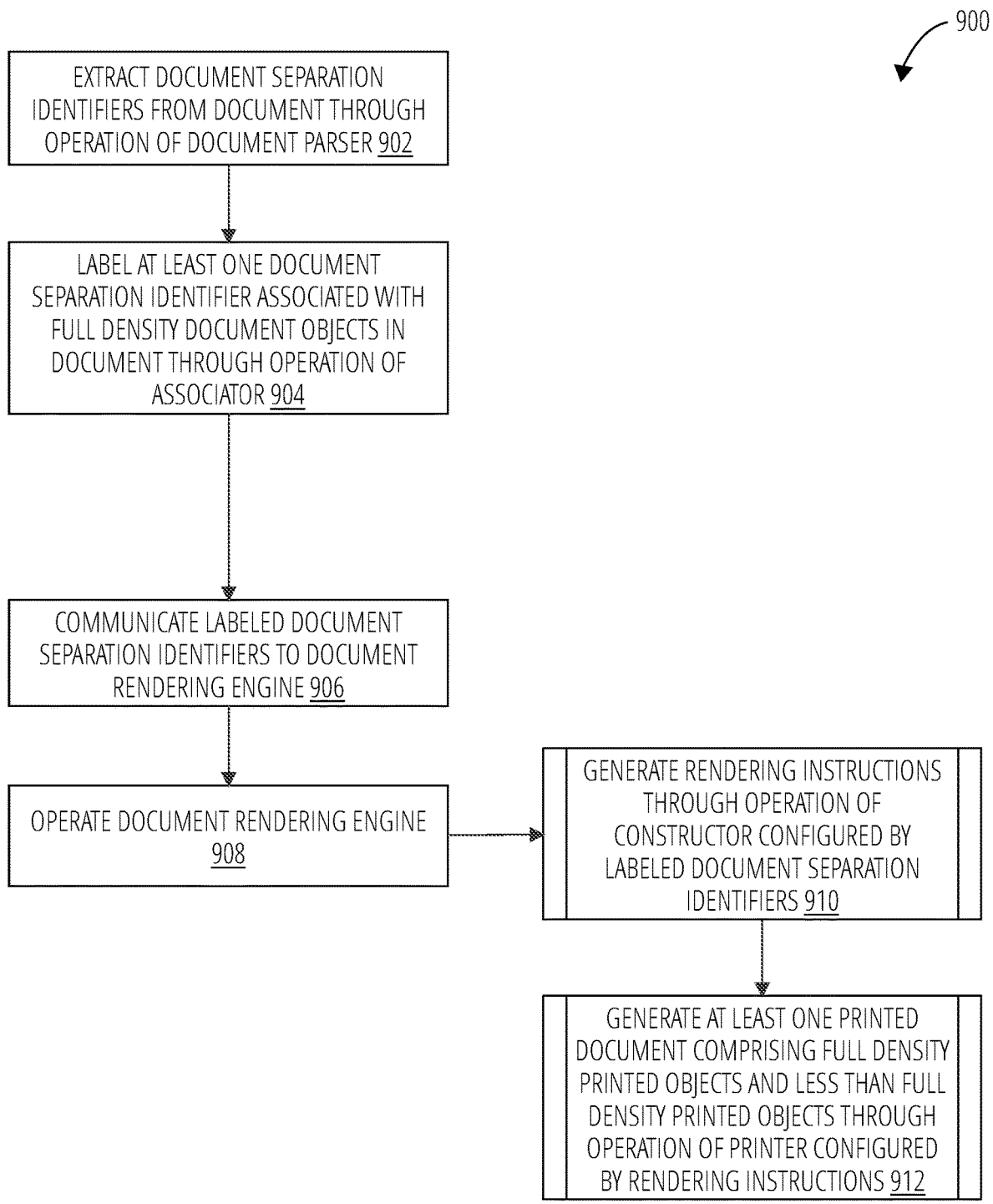
FIG. 9 illustrates a method 900 for controlling the rendering of objects in a printed document through a raster image processor in accordance with one embodiment.
Figure 10:
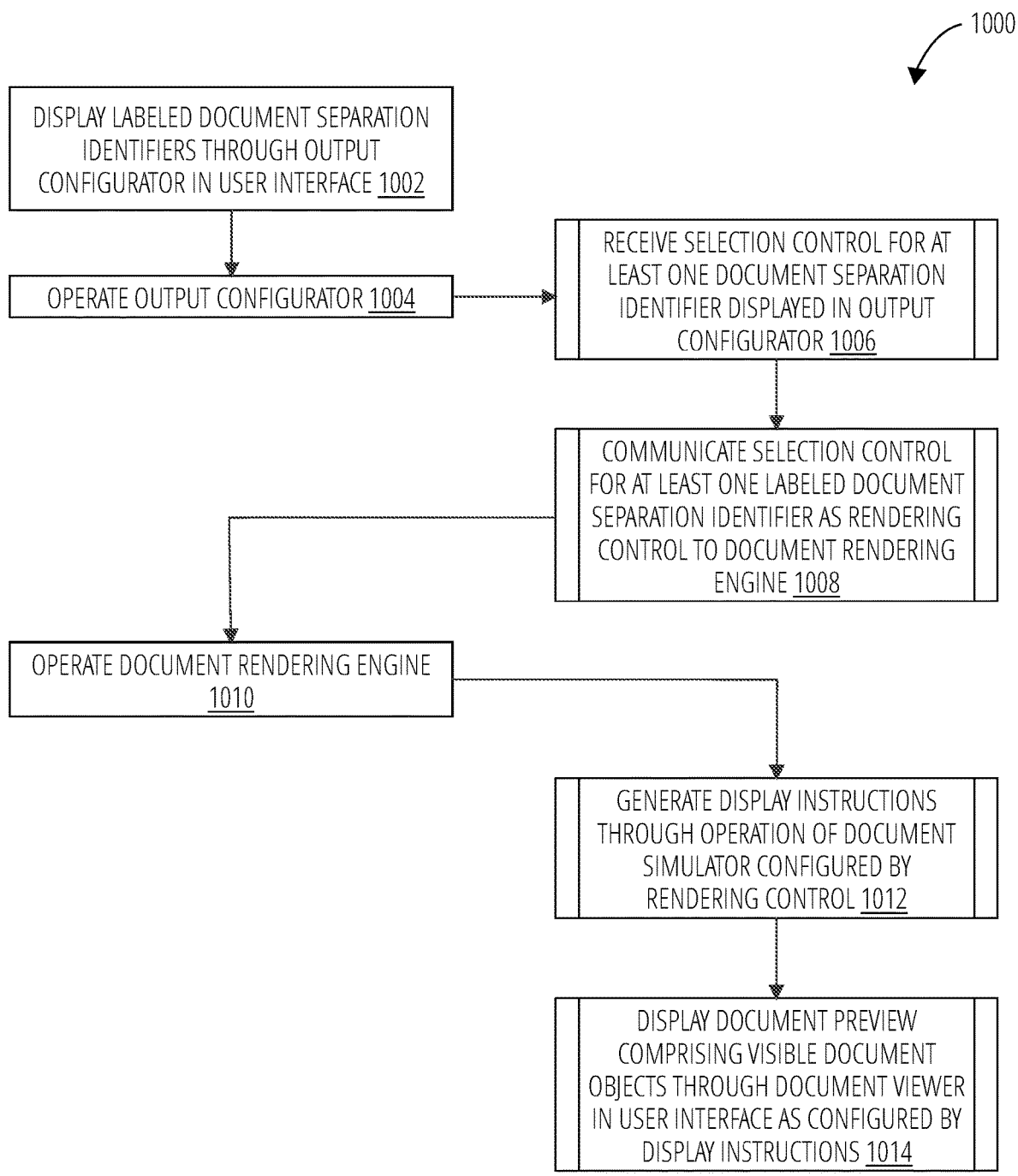
FIG. 10 illustrates a method 1000 for controlling the rendering of objects in a printed document through a raster image processor in accordance with one embodiment.

The system 100 may be operated in accordance with the method illustrated in FIG. 9 and FIG. 10.

Figure 2:
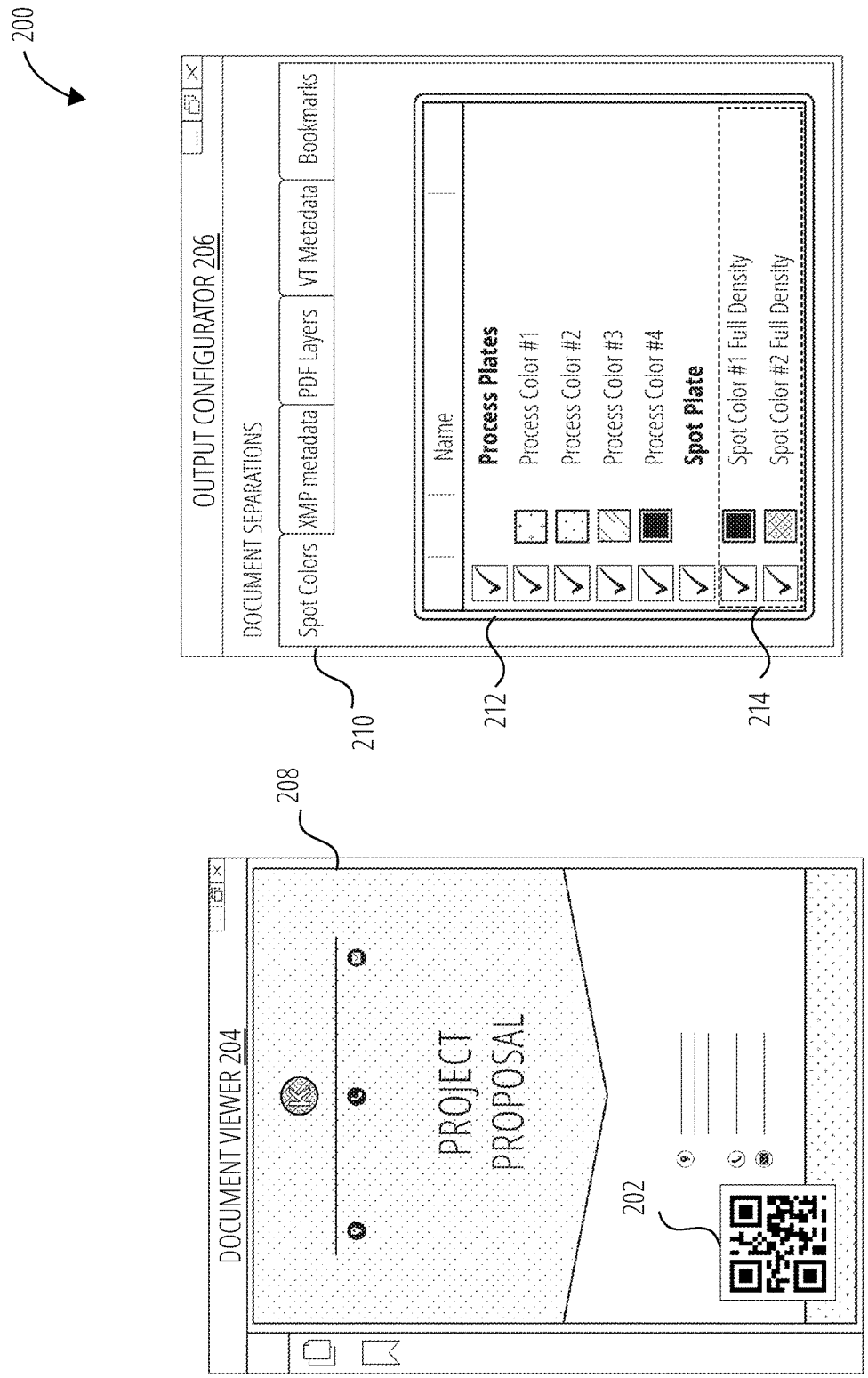
FIG. 2 illustrates a user interface 200 in accordance with one embodiment.

FIG. 2 illustrates a user interface 200 comprising an output configurator 206 and a document viewer 204. The document viewer 204 displays a document preview 208 with a QR code as a full density object 202. The output configurator 206 displays document separation identifiers 210 that may be grouped in different tabs. In the output configurator 206, the document separation identifiers 210 corresponds to a spot color tab. The spot color tab displays the color space library 212 for the document preview 208. The color space library 212 identifies the different color component present in the document preview 208, such as process colors and spot colors in a process plate and spot plate, respectively. The spot plate comprises two spot colors (i.e., Spot color #1 and Spot color #2) that are labeled spot colors 214, corresponding to the labeled document separation identifiers. Both of the labeled spot colors are identified as being full density and would be printed at full density through the printer.

Figure 3:
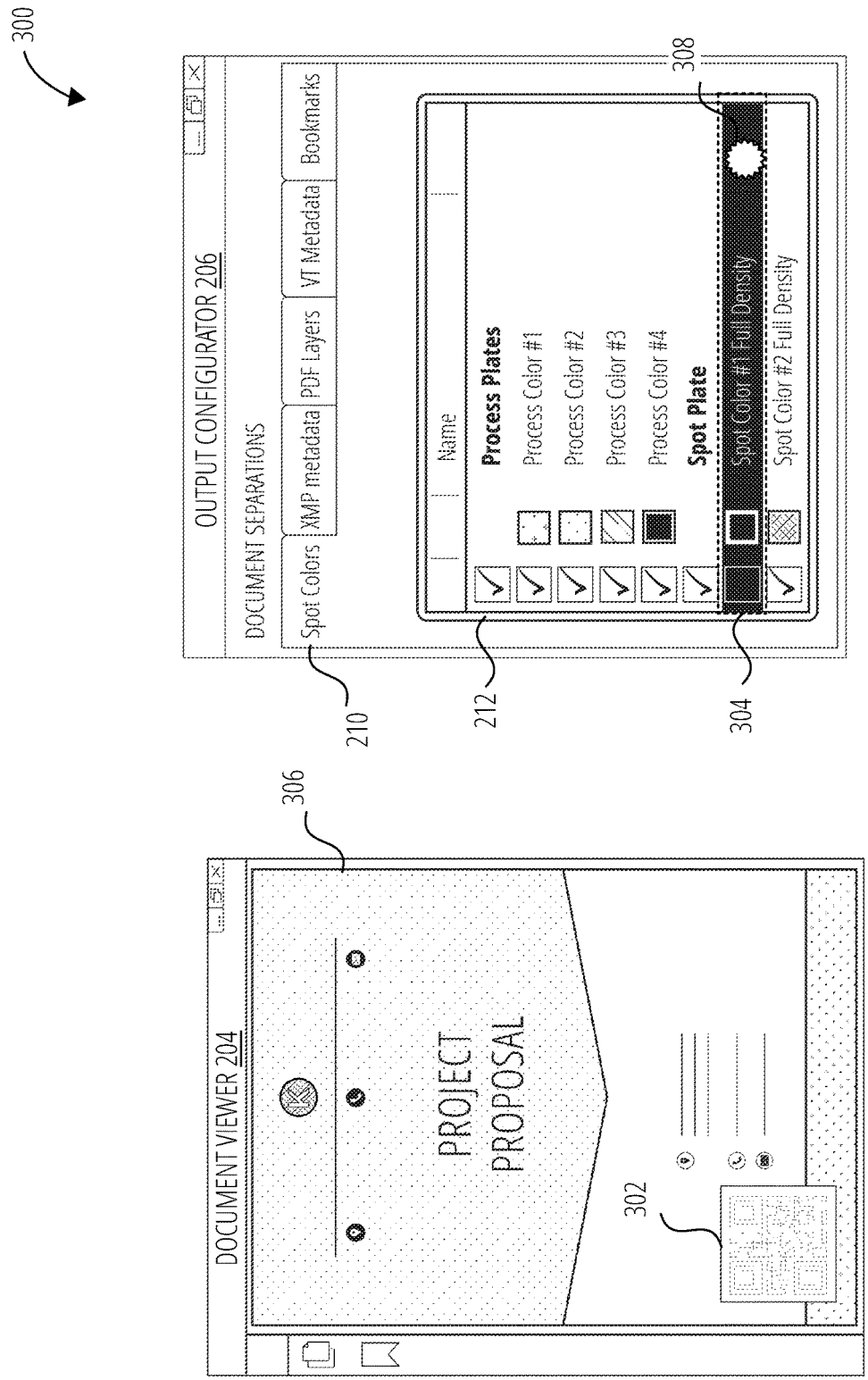
FIG. 3 illustrates a user interface 300 in accordance with one embodiment.

FIG. 3 illustrates a user interface 300 comprising the document viewer 204 and the output configurator 206. In the user interface 300, the output configurator 206 receives a selection control 308 for Spot Color #1 in the spot plate (deselected spot color 304). The change in the output configurator 206 is reflected in the document viewer 204 with the document preview 306 showing the QR code as invisible signifying that at least the QR code associated with the deselected spot color 304 would be a less than full density object 302 when printed.

Figure 4:
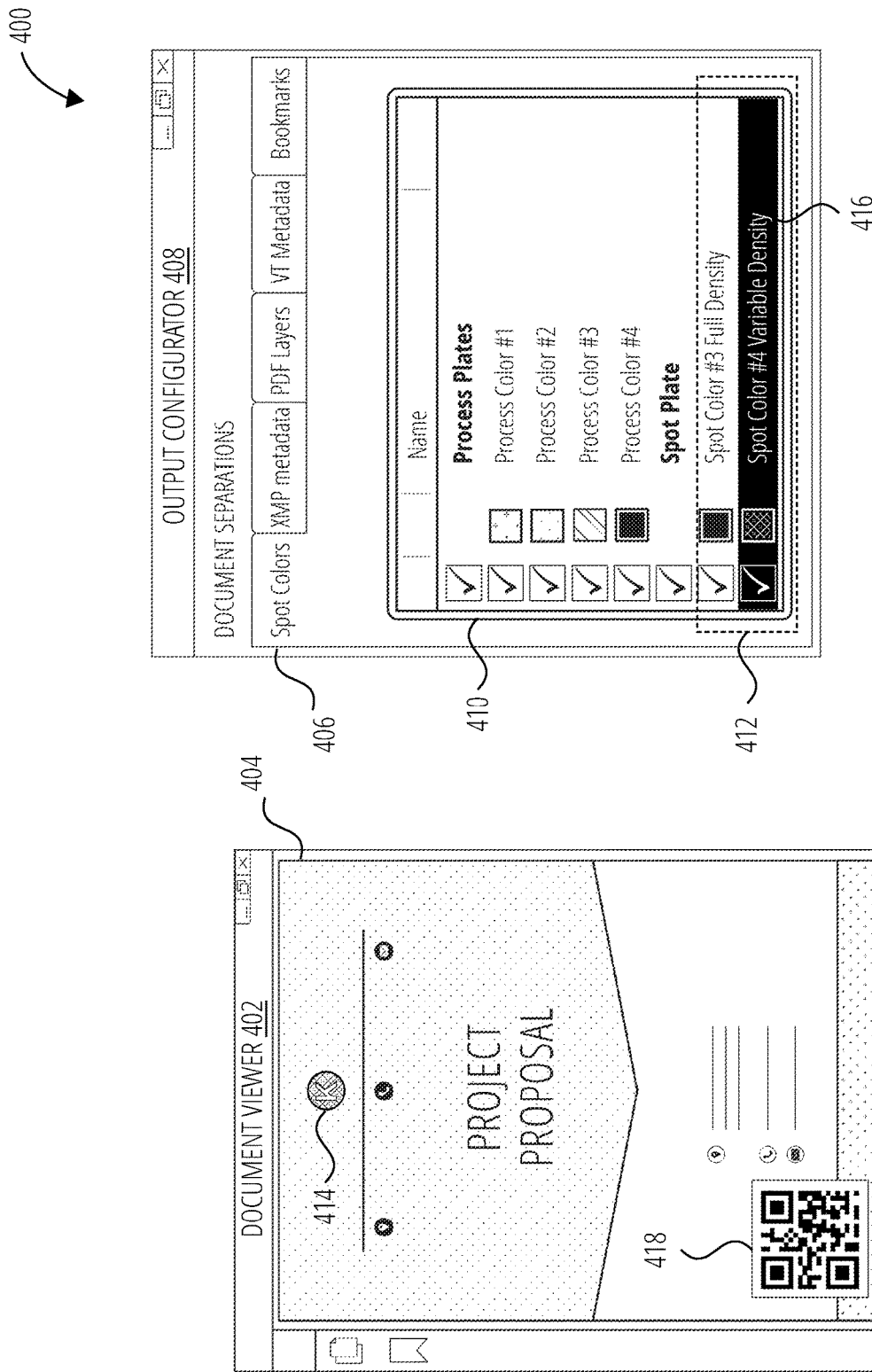
FIG. 4 illustrates a user interface 400 in accordance with one embodiment.

FIG. 4 illustrates a user interface 400 comprising an output configurator 408 and a document viewer 402. The output configurator 408 comprises tabs for different groups of document separation identifiers. The output configurator 408 displays document separation identifiers 406 associated with spot colors and identifies a spot color library associated with the document displayed as the document preview 404 in the document viewer 402. The color space library 410 for the document separation identifiers 406 shows the process plate and the spot plate. The spot plate corresponds to spot colors in the spot color library. The spot plate of the spot color library comprises spot color #3 and spot color #4. Spot color #3 and spot color #4 are labeled spot colors 412 but are not all identified as being for full density printing. Spot color #3 is identified as a being for full density printing and corresponds to the QR code (full density object 418) in the document preview 404. Spot color #4 is a variable density spot color 416 and produces less than full density object 414 when the document is printed.

Figure 5:
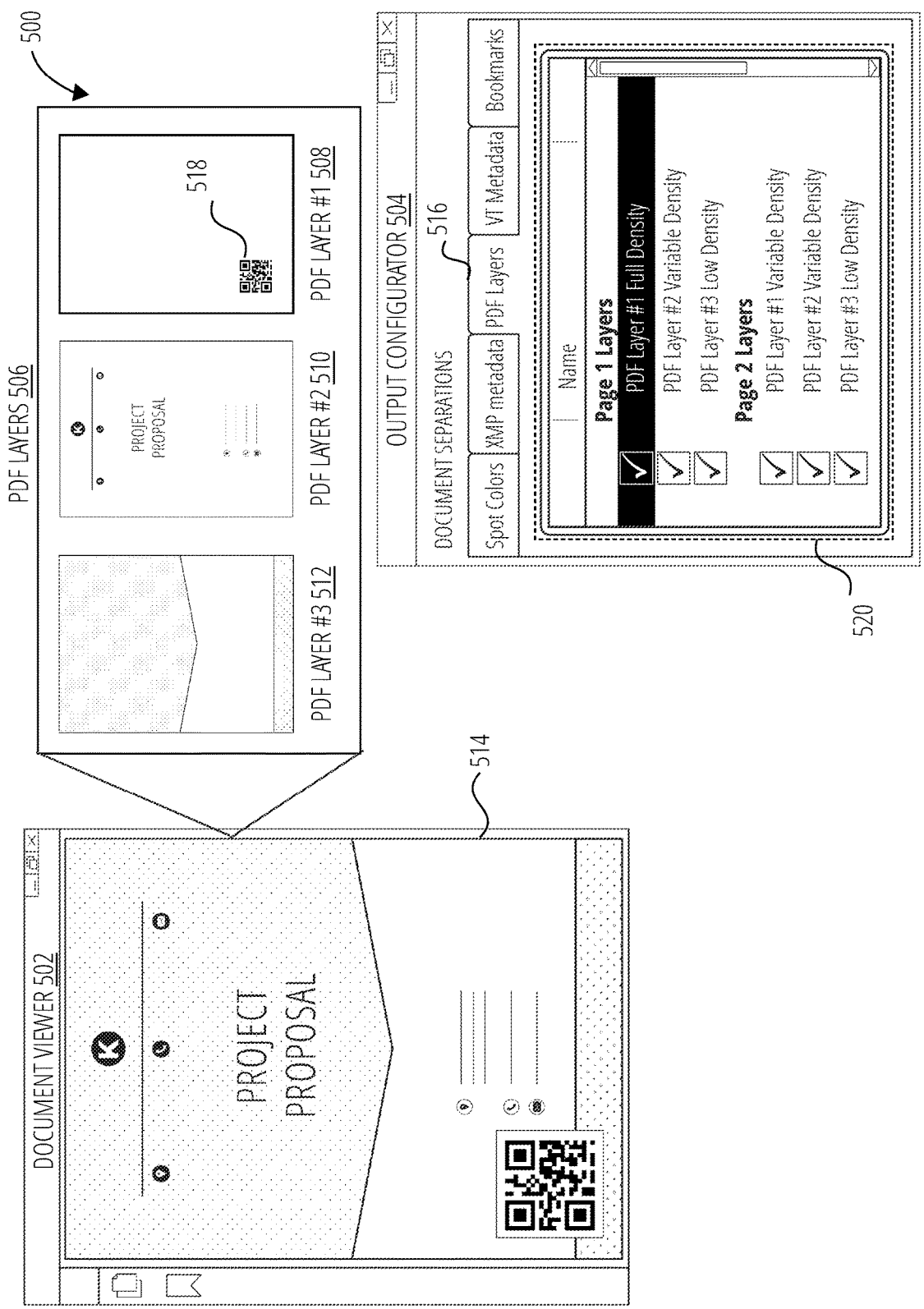
FIG. 5 illustrates a user interface 500 in accordance with one embodiment.

FIG. 5 illustrates a user interface 500 comprising an output configurator 504 and a document viewer 502. The output configurator 504 comprises different tabs corresponding to groups of document separation identifiers. The output configurator 504 shows PDF layers 520 as the document separation identifiers 516. The document represented as the document preview 514 in the document viewer 502 comprises PDF layers for each page. On Page 1 of the document, the PDF layers 506 may comprise PDF layer #1 508 as a top layer with a QR code as a document object 518. PDF layer #2 510 may include text objects, and PDF layer #3 512 may be the background. Based on the expected content or metadata associated with the PDF layers, the output configurator 504 may show that for page 1 of the document, the PDF layer #1 508 is to be printed at full density.

Figure 6:
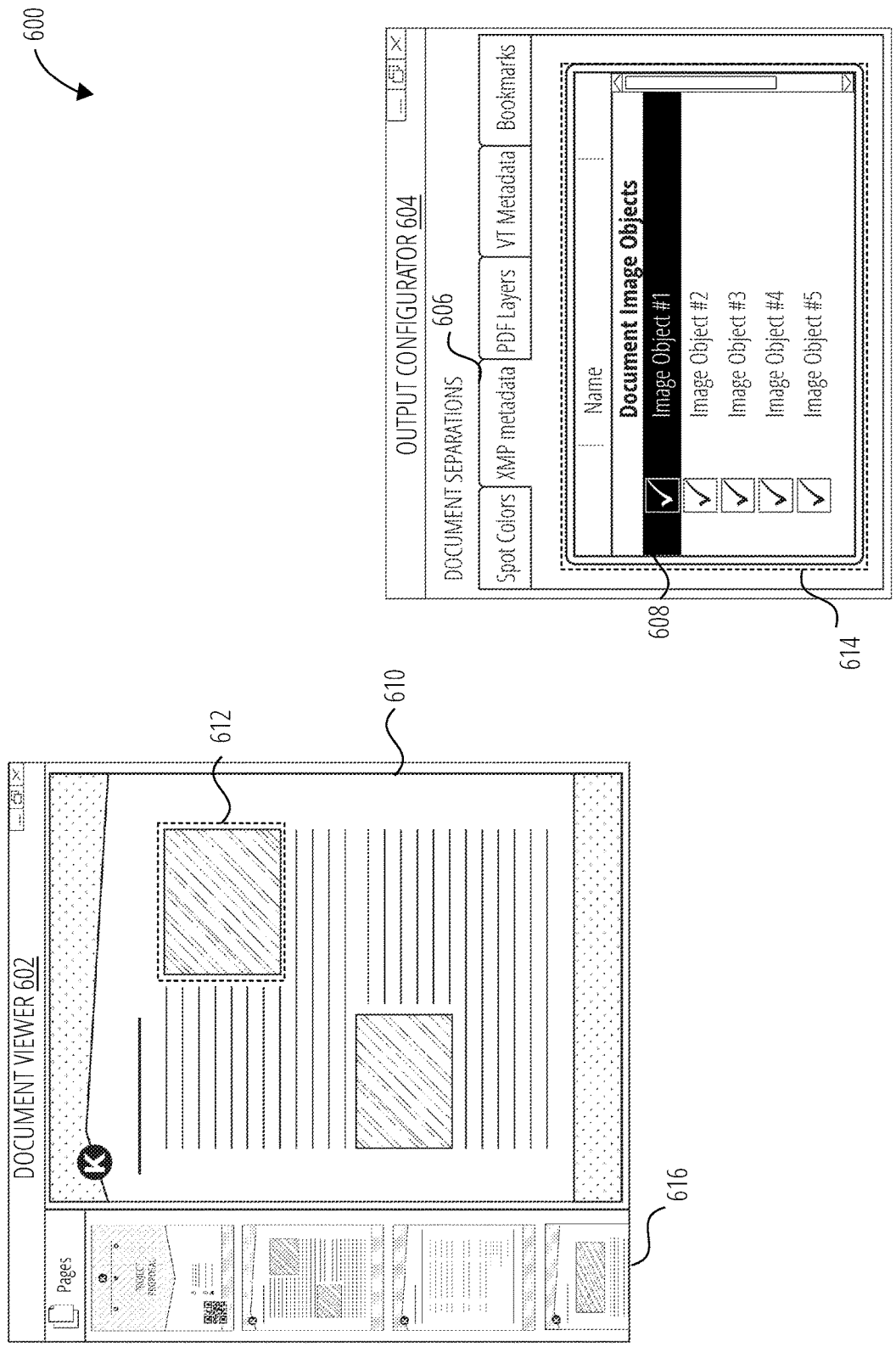
FIG. 6 illustrates a user interface 600 in accordance with one embodiment.

FIG. 6 illustrates a user interface 600 comprising an output configurator 604 and a document viewer 602. The document viewer 602 shows a document preview 610 corresponding to the second page of the document, as seen in the page preview 616 of the document viewer 602. The output configurator 604 displays document separation identifiers 606 corresponding to the metadata flagged image objects 614 in the document. A user may select or deselect the metadata flagged image objects 614 based on the desired print density. In the output configurator 604, the selected image object 608 corresponds to the image object 612 in the document preview 610. If the selected image object 608 is de-selected, the image object 612 would be hidden and may be printed at less than full density. In some configurations, the metadata flagged image objects 614 may be identified by XMP metadata corresponding to an image file such as a JPEG.

Figure 7:
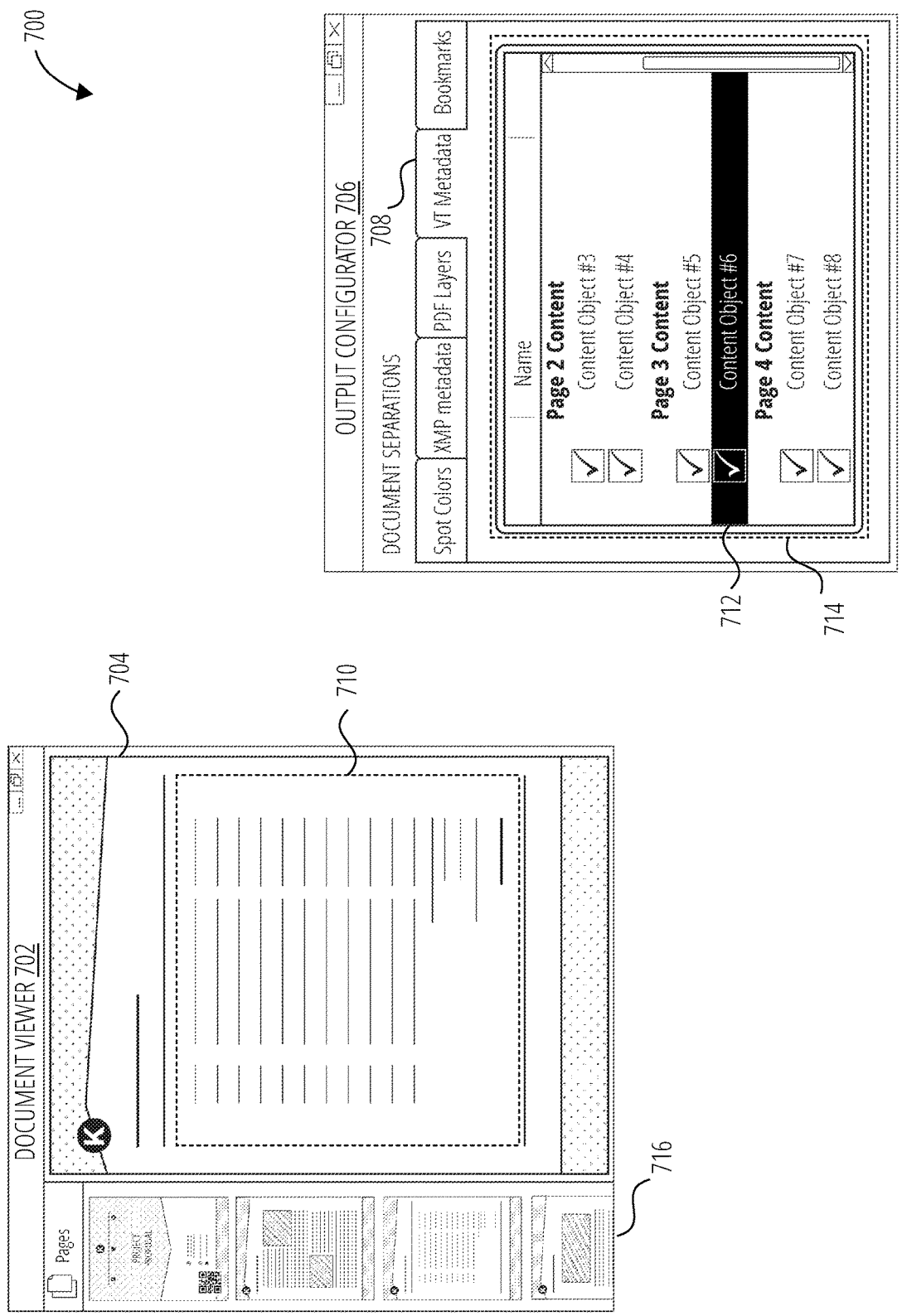
FIG. 7 illustrates a user interface 700 in accordance with one embodiment.

FIG. 7 illustrates a user interface 700 comprising an output configurator 706 and a document viewer 702. In the output configurator 706, the document separation identifiers 708 correspond to metadata flagged content objects 714. The metadata flagged content objects 714 may be PDF/VT metadata identifying tables or spreadsheets. In the document viewer 702, the document preview 704 corresponds to page 3 of the document as seen in the page preview 716 of the document viewer 702. In the output configurator 706, one of the selected metadata flagged content objects 712 is identified as a content object #6 on page 3 of the document. The content object #6 corresponds to the content object 710 in the document preview 704. The selected metadata flagged content objects 712 may be de-selected to render the content object(s) as less than full density.

Figure 8:
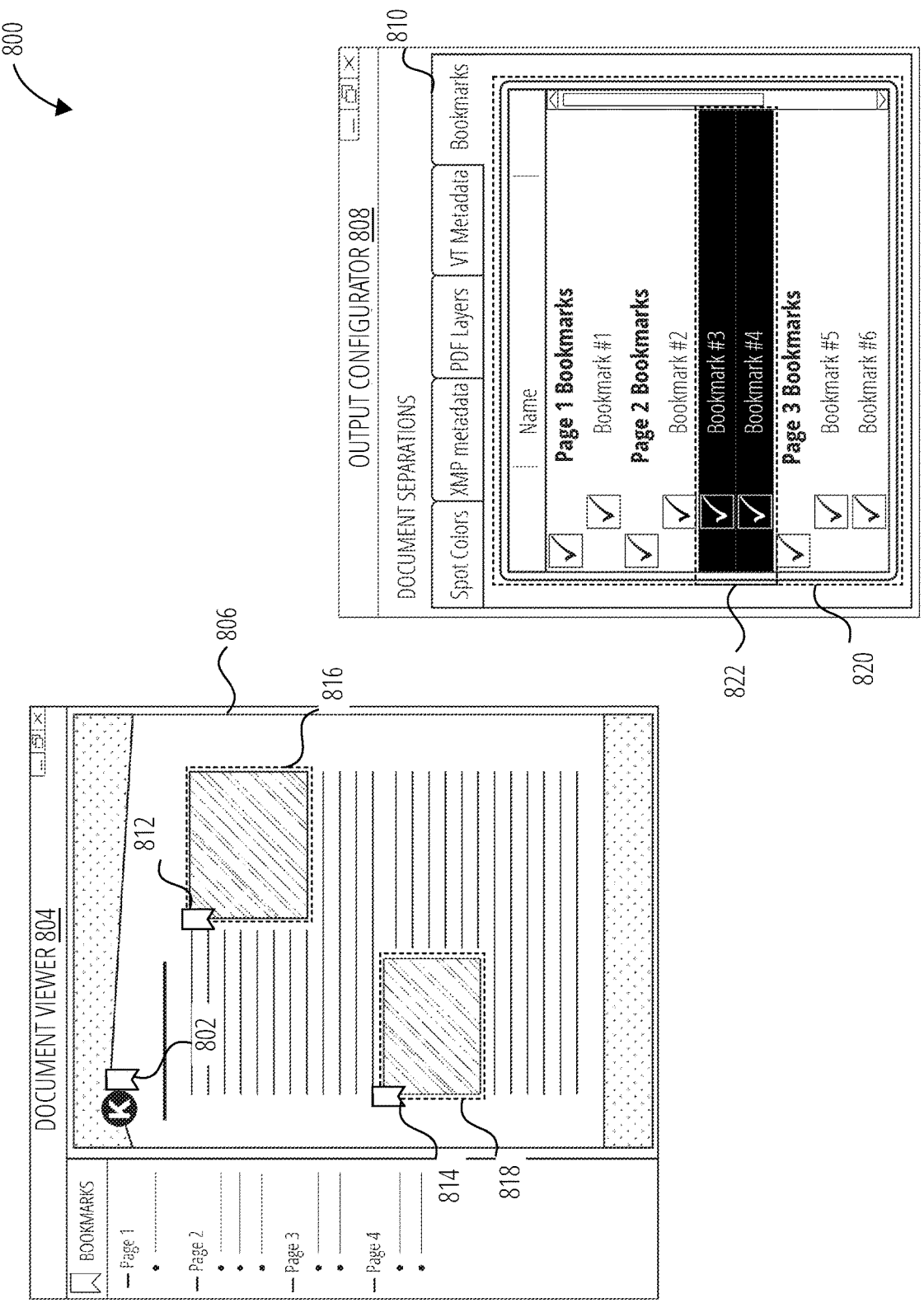
FIG. 8 illustrates a user interface 800 in accordance with one embodiment.

FIG. 8 illustrates a user interface 800 comprising an output configurator 808 and a document viewer 804. The document viewer 804 displays a document preview 806 of page 2 of the document. The output configurator 808 comprises document separation identifiers 810 corresponding to PDF bookmark identifiers 820. The PDF bookmark identifiers 820 correspond to bookmarked locations within the PDF document that may at least identify pages of the document that should be rendered at full density. In some configurations, the bookmarks maybe utilized to identify content objects within pages that are associated with a PDF bookmark at full density. For example, PDF bookmark identifiers 820 list bookmarks by page. The list of Page 2 bookmarks include bookmark #2, #3, and #4. The bookmark #2 corresponds to bookmark 802 associated with a logo. Bookmark #3 and #4 correspond to bookmark 812 and bookmark 814 respectively and are associated with image object 816 and image object 818, respectively. In the output configurator 808, the PDF bookmarks 822 may be deselected to render the image object 816 and the image object 818 at less than full density.

In FIG. 9, a method 900 for controlling the rendering of objects in a printed document through a raster image processor extracts document separation identifiers from a document through operation of a document parser (block 902). In block 904, the method 900 labels at least one document separation identifier associated with full density document objects in the document through operation of an associator. In block 906, the method 900 communicates labeled document separation identifiers to a document rendering engine. In block 908, method 900 operates the document rendering engine. In subroutine block 910, the document rendering engine generates rendering instructions through operation of a constructor configured by the labeled document separation identifiers. In subroutine block 912, the document rendering engine generates at least one printed document comprising full density printed objects and less than full density printed objects through operation of a printer configured by the rendering instructions.

In FIG. 10, a method 1000 for controlling the rendering of objects in a printed document through a raster image processor displays the labeled document separation identifiers through an output configurator in a user interface (block 1002). In block 1004, the method 1000 operates the output configurator. In subroutine block 1006, the output configurator receives a selection control for the at least one labeled document separation identifier displayed in the output configurator, wherein the selection control identifies at least one document object associated with a labeled document separation identifier as a less than full density object. In subroutine block 1008, the output configurator communicates the selection control for the at least one document separation identifier as a rendering control to the document rendering engine. In block 1010, the method 1000 operates the document rendering engine. In subroutine block 1012, the document rendering engine generates display instructions through operation of a document simulator configured by the rendering control. In subroutine block 1014, the document rendering engine displays a document preview comprising visible document objects through a document viewer in the user interface as configured by the display instructions.

Figure 11:
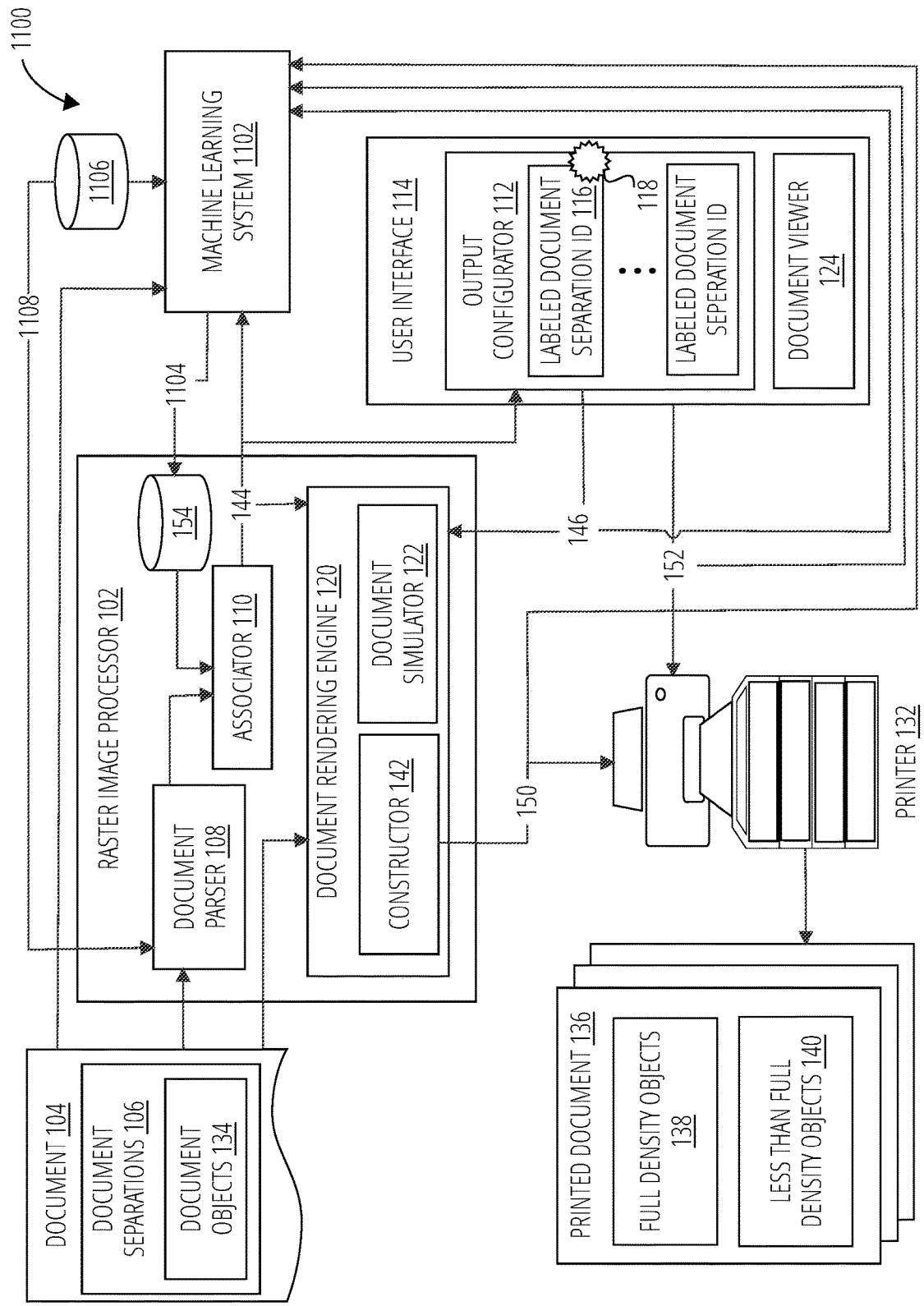
FIG. 11 illustrates a system 1100 in accordance with one embodiment.

FIG. 11 illustrates a system 1100 for controlling the rendering of objects in a printed document through a raster image processor. The system 1100 comprises a raster image processor 102, a user interface 114, a machine learning system 1102, and a printer 132. The machine learning system 1102 may be utilized to generate new or updated rendering associations 1104 for labeled document separation identifiers from at least the document 104 and the rendering instructions 150. In some configurations, the machine learning system 1102 may utilize inputs such as the labeled document separation identifiers 144, the rendering control 146, print control 152 or combinations thereof to generate the rendering associations 1104. The rendering associations 1104 may be utilized to modify labels for document separation identifiers indicating that they should or shouldn't be rendered as full density objects. The machine learning system 1102 may also be trained utilizing training data 1106 to identify the modification of labels for the document separation identifiers as well as identifying new document separations 1108 in the document 104 to be labeled as full density or less than full density objects.

In some configurations, the document separation identifiers may be used as training input for the machine learning system 1102. This would allow the machine learning system 1102 to learn which types of objects are printed at full density. The system can use the learning to identify full density objects on documents that do not have any document separation identifiers. This may eliminate the need for document separation identifiers in the document.

Figure 12:
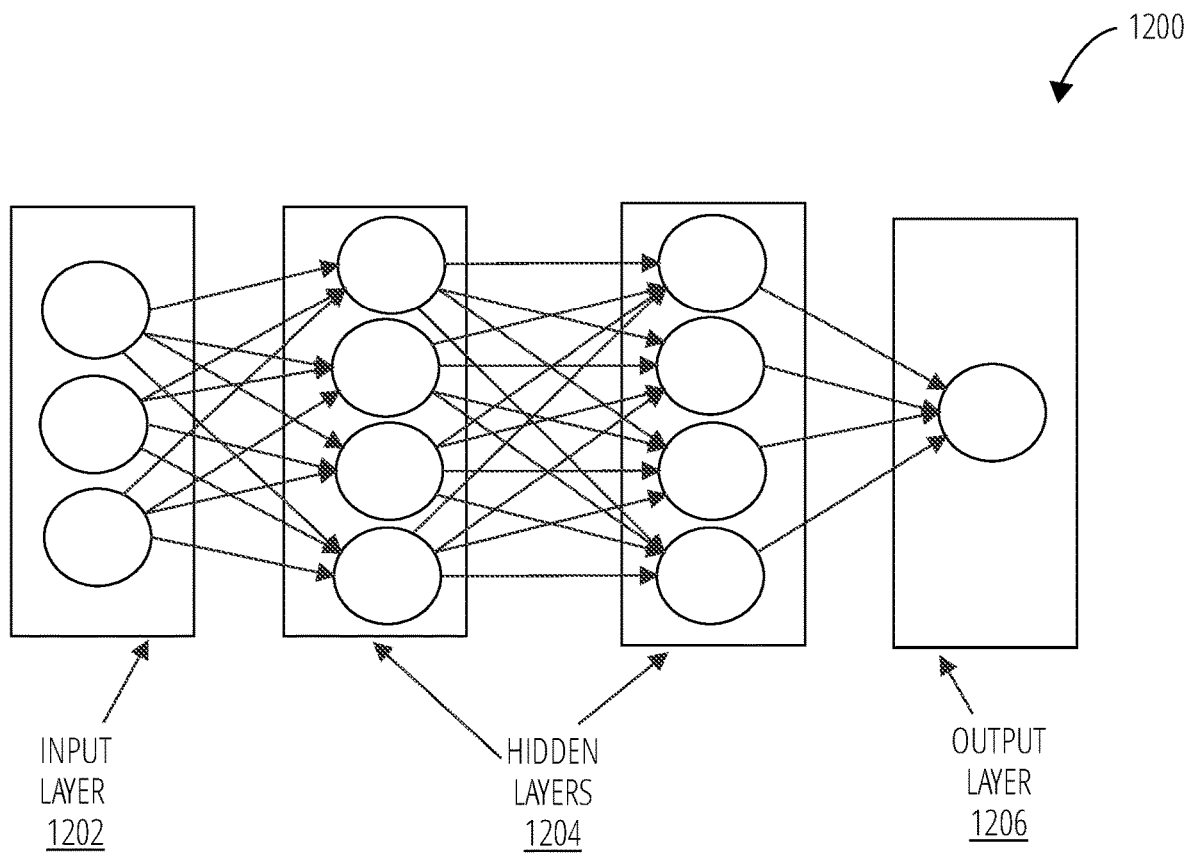
FIG. 12 illustrates a basic deep neural network 1200 in accordance with one embodiment.

In some configurations, the machine learning system 1102 may be accomplished by machine learning algorithms such as neural networks, decisions trees, support vector machines, bayesian networks, etc. In some configurations the machine learning system 1102 may be an artificial neural network similar to the neural network described in the FIG. 12 and FIG. 13.

A basic deep neural network 1200 is based on a collection of connected units or nodes called artificial neurons which loosely model the neurons in a biological brain. Each connection, like the synapses in a biological brain, can transmit a signal from one artificial neuron to another. An artificial neuron that receives a signal can process it and then signal additional artificial neurons connected to it.

In common implementations, the signal at a connection between artificial neurons is a real number, and the output of each artificial neuron is computed by some non-linear function (the activation function) of the sum of its inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals travel from the first layer (the input layer 1202), to the last layer (the output layer 1206), possibly after traversing one or more intermediate layers, called hidden layers 1204.

Figure 13:
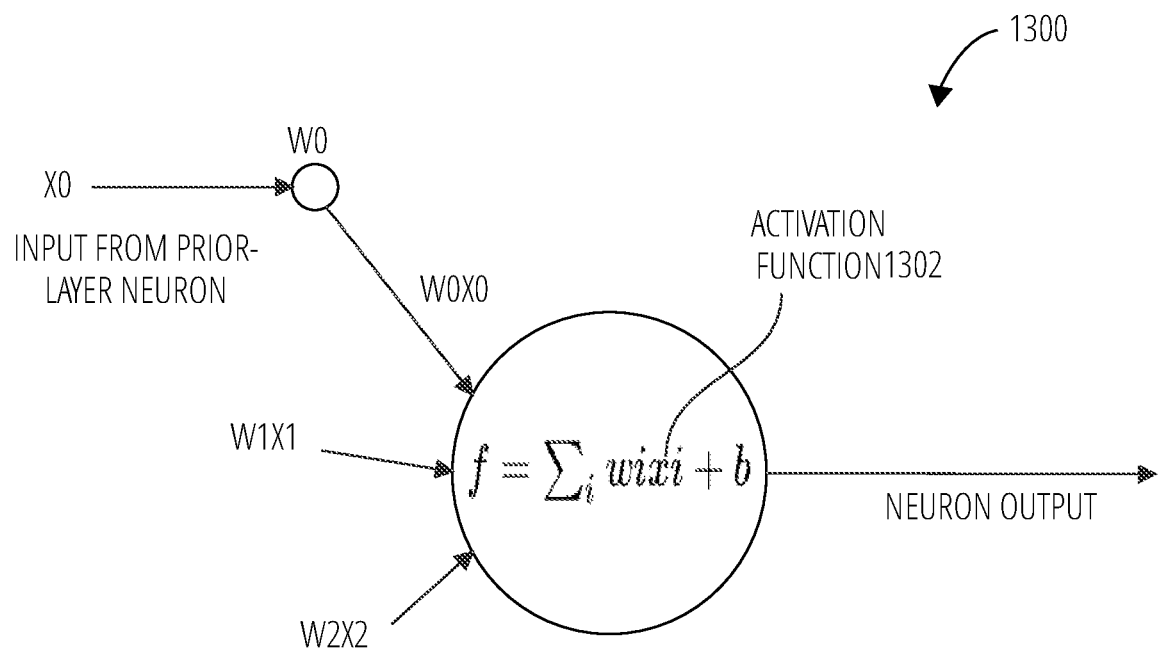
FIG. 13 illustrates an artificial neuron 1300 in accordance with one embodiment.

Referring to FIG. 13, an artificial neuron 1300 receiving inputs from predecessor neurons may include the following components:

inputs $x_i$;
weights $w_i$ applied to the inputs;
an optional threshold (b), which stays fixed unless changed by a learning function; and
an activation function 1302 that computes the output from the previous neuron inputs and threshold, if any.

An input neuron has no predecessor but serves as input interface for the whole network. Similarly an output neuron has no successor and thus serves as output interface of the whole network.

The network includes connections, each connection transferring the output of a neuron in one layer to the input of a neuron in a next layer. Each connection carries an input x and is assigned a weight w.

The activation function 1302 often has the form of a sum of products of the weighted values of the inputs of the predecessor neurons.

The learning rule is a rule or an algorithm which modifies the parameters of the neural network, in order for a given input to the network to produce a favored output. This learning process typically involves modifying the weights and thresholds of the neurons and connections within the network.

Figure 14:
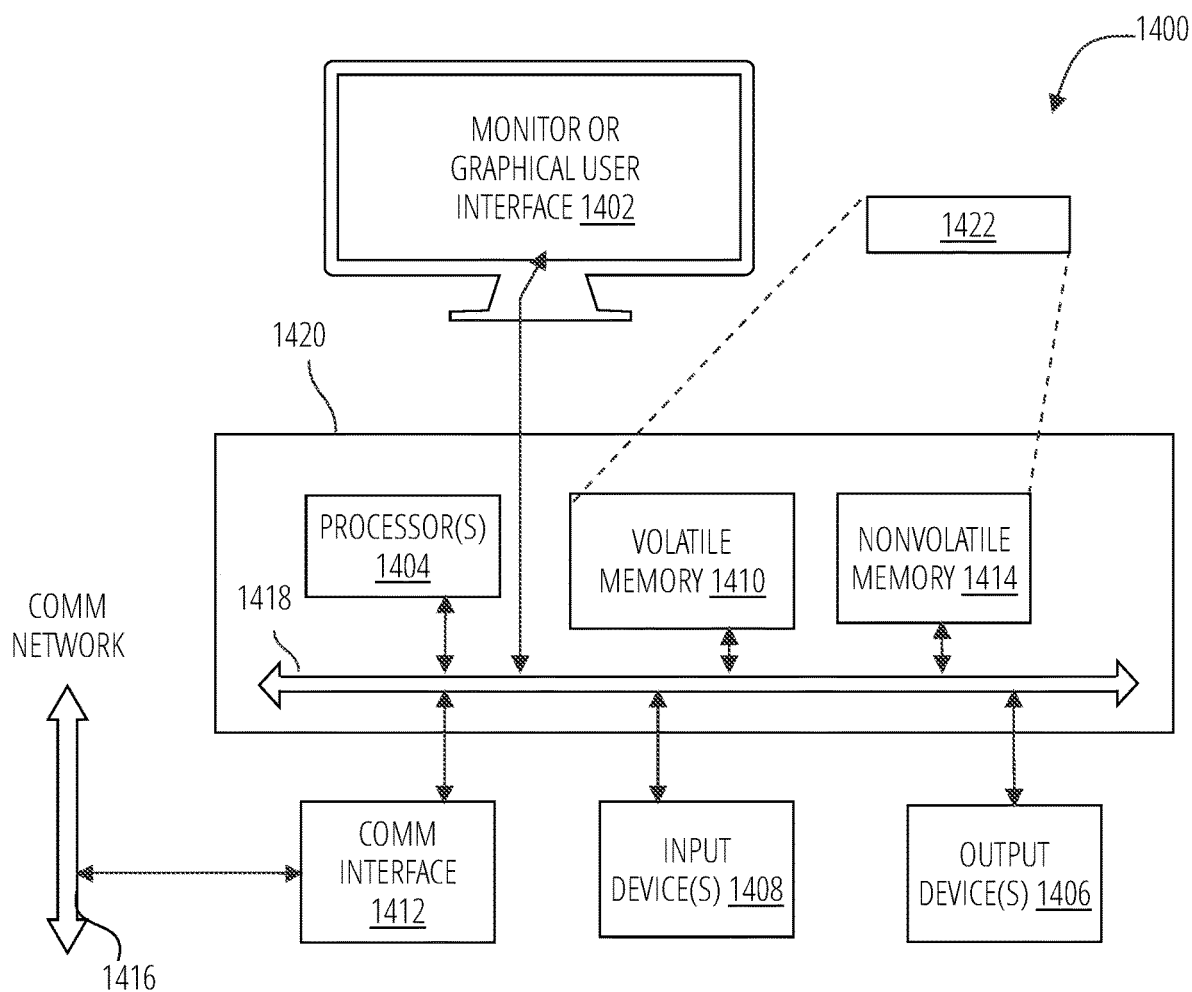
FIG. 14 is an example block diagram of a computing device 1400 that may incorporate embodiments of the present disclosure.

FIG. 14 is an example block diagram of a computing device 1400 that may incorporate embodiments of the present invention. FIG. 14 is merely illustrative of a machine system to carry out aspects of the technical processes described herein and does not limit the scope of the claims. One of ordinary skill in the art would recognize other variations, modifications, and alternatives. In one embodiment, the computing device 1400 typically includes a monitor or graphical user interface 1402, a data processing system 1420, a communication network interface 1412, input device(s) 1408, output device(s) 1406, and the like.

As depicted in FIG. 14, the data processing system 1420 may include one or more processor(s) 1404 that communicate with a number of peripheral devices via a bus subsystem 1418. These peripheral devices may include input device(s) 1408, output device(s) 1406, communication network interface 1412, and a storage subsystem, such as a volatile memory 1410 and a nonvolatile memory 1414.

The volatile memory 1410 and/or the nonvolatile memory 1414 may store computer-executable instructions and thus forming logic 1422 that when applied to and executed by the processor(s) 1404 implement embodiments of the processes disclosed herein.

The input device(s) 1408 include devices and mechanisms for inputting information to the data processing system 1420. These may include a keyboard, a keypad, a touch screen incorporated into the monitor or graphical user interface 1402, audio input devices such as voice recognition systems, microphones, and other types of input devices. In various embodiments, the input device(s) 1408 may be embodied as a computer mouse, a trackball, a track pad, a joystick, wireless remote, drawing tablet, voice command system, eye tracking system, and the like. The input device(s) 1408 typically allow a user to select objects, icons, control areas, text and the like that appear on the monitor or graphical user interface 1402 via a command such as a click of a button or the like.

The output device(s) 1406 include devices and mechanisms for outputting information from the data processing system 1420. These may include the monitor or graphical user interface 1402, speakers, printers, infrared LEDs, and so on as well understood in the art.

The communication network interface 1412 provides an interface to communication networks (e.g., communication network 1416) and devices external to the data processing system 1420. The communication network interface 1412 may serve as an interface for receiving data from and transmitting data to other systems. Embodiments of the communication network interface 1412 may include an Ethernet interface, a modem (telephone, satellite, cable, ISDN), (asynchronous) digital subscriber line (DSL), FireWire, USB, a wireless communication interface such as Bluetooth or WiFi, a near field communication wireless interface, a cellular interface, and the like.

The communication network interface 1412 may be coupled to the communication network 1416 via an antenna, a cable, or the like. In some embodiments, the communication network interface 1412 may be physically integrated on a circuit board of the data processing system 1420, or in some cases may be implemented in software or firmware, such as "soft modems", or the like.

The computing device 1400 may include logic that enables communications over a network using protocols such as HTTP, TCP/IP, RTP/RTSP, IPX, UDP and the like.

The volatile memory 1410 and the nonvolatile memory 1414 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1410 and the nonvolatile memory 1414 may be configured to store the basic programming and data constructs that provide the functionality of the disclosed processes and other embodiments thereof that fall within the scope of the present invention.

Logic 1422 that implements embodiments of the present invention may be stored in the volatile memory 1410 and/or the nonvolatile memory 1414. Said logic 1422 may be read from the volatile memory 1410 and/or nonvolatile memory 1414 and executed by the processor(s) 1404. The volatile memory 1410 and the nonvolatile memory 1414 may also provide a repository for storing data used by the logic 1422.

The volatile memory 1410 and the nonvolatile memory 1414 may include a number of memories including a main random access memory (RAM) for storage of instructions and data during program execution and a read only memory (ROM) in which read-only non-transitory instructions are stored. The volatile memory 1410 and the nonvolatile memory 1414 may include a file storage subsystem providing persistent (non-volatile) storage for program and data files. The volatile memory 1410 and the nonvolatile memory 1414 may include removable storage systems, such as removable flash memory.

The bus subsystem 1418 provides a mechanism for enabling the various components and subsystems of data processing system 1420 communicate with each other as intended. Although the communication network interface 1412 is depicted schematically as a single bus, some embodiments of the bus subsystem 1418 may utilize multiple distinct busses.

It will be readily apparent to one of ordinary skill in the art that the computing device 1400 may be a device such as a smartphone, a desktop computer, a laptop computer, a rack-mounted computer system, a computer server, or a tablet computer device. As commonly known in the art, the computing device 1400 may be implemented as a collection of multiple networked computing devices. Further, the computing device 1400 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

The methods and system in this disclosure are described in the preceding on the basis of several preferred embodiments. Different aspects of different variants are considered to be described in combination with each other such that all combinations, upon reading by a skilled person in the field on the basis of this document, may be regarded as being read within the concept of the disclosure. The preferred embodiments do not limit the extent of protection of this document.

Having thus described embodiments of the present disclosure of the present application in detail and by reference to illustrative embodiments thereof, it will be apparent that modifications and variations are possible without departing from the scope of the present disclosure.

What is claimed is:

1. A method for controlling rendering of objects in a printed document through a raster image processor, the method comprising:
    extracting document separation identifiers from a document through operation of a document parser;
    labeling at least one document separation identifier associated with full density document objects in the document through operation of an associator;
    communicating labeled document separation identifiers to a document rendering engine; operating the document rendering engine to generate rendering instructions through operation of a constructor configured by the labeled document separation identifiers;
    generating at least one printed document comprising full density printed objects and less than full density printed objects through operation of a printer configured by the rendering instructions;
    displaying the labeled document separation identifiers through an output configurator in a user interface;
    operating the output configurator to:
        receive a selection control for at least one labeled document separation identifier displayed in the output configurator, wherein the selection control identifies at least one document object associated with the at least one labeled document separation identifier as a less than full density object; and
        communicate the selection control for the at least one labeled document separation identifier as a rendering control to the document rendering engine; and operating the document rendering engine to:
generate display instructions through operation of a document simulator configured by the rendering control; and
display a document preview comprising visible document objects through a document viewer in the user interface as configured by the display instructions.

2. The method of claim 1, wherein the associator communicates with an association table for identifying the document separation identifiers associated with full density printing and less than full density printing.

3. The method of claim 1, wherein the document separation identifiers are spot colors.

4. The method of claim 1, wherein the document separation identifiers are spot colors in a spot color library.

5. The method of claim 1, wherein the document separation identifiers are PDF layers associated with a document object.

6. The method of claim 1, wherein the document separation identifiers are metadata flagged image objects.

7. The method of claim 1, wherein the document separation identifiers are metadata flagged content objects.

8. The method of claim 1, wherein the document separation identifiers are PDF layers associated with at least one content object or image object.

9. The method of claim 1 further comprising:
operating a machine learning system to identify full density objects in the document, wherein the machine learning system has been trained, using document separation identifiers, to identify which types of objects are printed as the full density objects.

10. A system for controlling rendering of objects in a printed document through a raster image processor comprising:
a document parser configured to extract document separation identifiers from a document;
an associator configured to label at least one document separation identifier associated with full density document objects in the document;
a document rendering engine configured to:
receive labeled document separation identifiers; and
generate rendering instructions through operation of a constructor configured by the labeled document separation identifiers;
a printer configured by the rendering instructions to generate at least one printed document comprising full density printed objects and less than full density printed objects;
a user interface comprising an output configurator and a document viewer;
the output configurator configured to:
display the labeled document separation identifiers;
receive a selection control for at least one labeled document separation identifier displayed in the output configurator, wherein the selection control identifies at least one document object associated with the at least one labeled document separation identifier as a less than full density object; and
communicate the selection control for the at least one document separation identifier as a rendering control to the document rendering engine; and
the document rendering engine configured to:
generate display instructions through operation of a document simulator configured by the rendering control; and
display a document preview comprising visible document objects through the document viewer in the user interface as configured by the display instructions.

11. The system of claim 10, wherein the associator communicates with an association table for identifying the document separation identifiers associated with full density printing and less than full density printing.

12. The system of claim 10, wherein the document separation identifiers are spot colors.

13. The system of claim 10, wherein the document separation identifiers are spot colors in a spot color library.

14. The system of claim 10, wherein the document separation identifiers are PDF layers associated with a document object.

15. The system of claim 10, wherein the document separation identifiers are metadata flagged image objects.

16. The system of claim 10, wherein the document separation identifiers are metadata flagged content objects.

17. The system of claim 10, wherein the document separation identifiers are PDF layers associated with at least one content object or image object.

18. The system of claim 10 further comprising:
a machine learning system configured to:
identify full density objects in the document, wherein the machine learning system has been trained, using document separation identifiers, to identify which types of objects are printed as the full density objects.

* * * * *